F. S. LONG.
SHIP DETECTOR.
APPLICATION FILED FEB. 21, 1908.

948,424.

Patented Feb. 8, 1910.

Witnesses:
Howard Hanscom
Nathan C. Lombard

Inventor:
Frank S. Long,
by Walter E. Lombard,
Atty.

F. S. LONG.
SHIP DETECTOR.
APPLICATION FILED FEB. 21, 1908.

948,424.

Patented Feb. 8, 1910.
3 SHEETS—SHEET 2.

Witnesses:
Howard Hanscom
Nathan C. Lombard

Inventor:
Frank S. Long,
by Walter E. Lombard,
Atty.

F. S. LONG.
SHIP DETECTOR.
APPLICATION FILED FEB. 21, 1908.

948,424.

Patented Feb. 8, 1910.
3 SHEETS—SHEET 3.

Witnesses:
Howard Hanscom
Nathan C. Lombard

Inventor:
Frank S. Long,
by Walter E. Lombard
Atty.

UNITED STATES PATENT OFFICE.

FRANK S. LONG, OF THE UNITED STATES ARMY.

SHIP-DETECTOR.

948,424.

Specification of Letters Patent.

Patented Feb. 8, 1910.

Application filed February 21, 1908. Serial No. 417,198.

*To all whom it may concern:*

Be it known that I, FRANK S. LONG, a citizen of the United States of America, and a captain in the U. S. Army, stationed at Fort Andrews, in the town of Hull, Plymouth county, State of Massachusetts, have invented certain new and useful Improvements in Ship-Detectors, of which the following is a specification.

In defending a coast by means of shore fortifications from an attack by the warships of an enemy it is essential that the positions of the various vessels be accurately located by the defenders so that the proper corrected range and azimuth may be sent to gun commanders in order that the guns may be aimed or laid in such a manner that the projectiles fired therefrom will strike at the exact point determined upon.

The system adopted in the United States Coast Artillery in order to accomplish this result depends upon the accurate plotting of the position of the vessels, the range and azimuth of which is first determined by suitable position finders.

While the system works very satisfactorily under ordinary conditions when the vessels can be clearly seen by the observers through the telescopes forming a part of the position finding instruments, it has the great disadvantage that under abnormal conditions when the vessels cannot be thus seen the entire system is put out of commission. It is evident that these abnormal conditions frequently occur as, for instance, in foggy or hazy weather, or in the night time when the shore illuminating lights and searchlights are weak or defective. It is obvious, therefore, that some provision should be made by which the location of the vessels of an enemy may be determined even under these adverse conditions and it is the object of the present invention to provide a means whereby this most important defect in the present system of coast defense may be entirely overcome.

The invention consists in providing the water area in front of a system of coast defense with a plurality of groups of devices the position of each of which is accurately plotted on a chart to be placed upon the ordinary plotting board used in the fire commander's station.

Each of the devices is electrically connected to audible and visual signals and indicators at the fire commander's station and each device is provided with an apparatus which is adapted to operate said indicators whenever a disturbing element enters its immediate vicinity, such apparatus including a device, such as a magnetic needle, which will be moved from its normal position whenever any object such as a vessel, containing a mass of metal, enters its sphere of magnetic influence and thus close an electric circuit to cause the operation of the indicator on shore or at some other distant point.

The invention further consists in certain novel features of construction and arrangement of parts which will be readily understood by reference to the description of the drawings and to the claims hereinafter given.

Of the drawings.

Similar characters designate like parts throughout the several figures of the drawings.

Figures 1, 2:
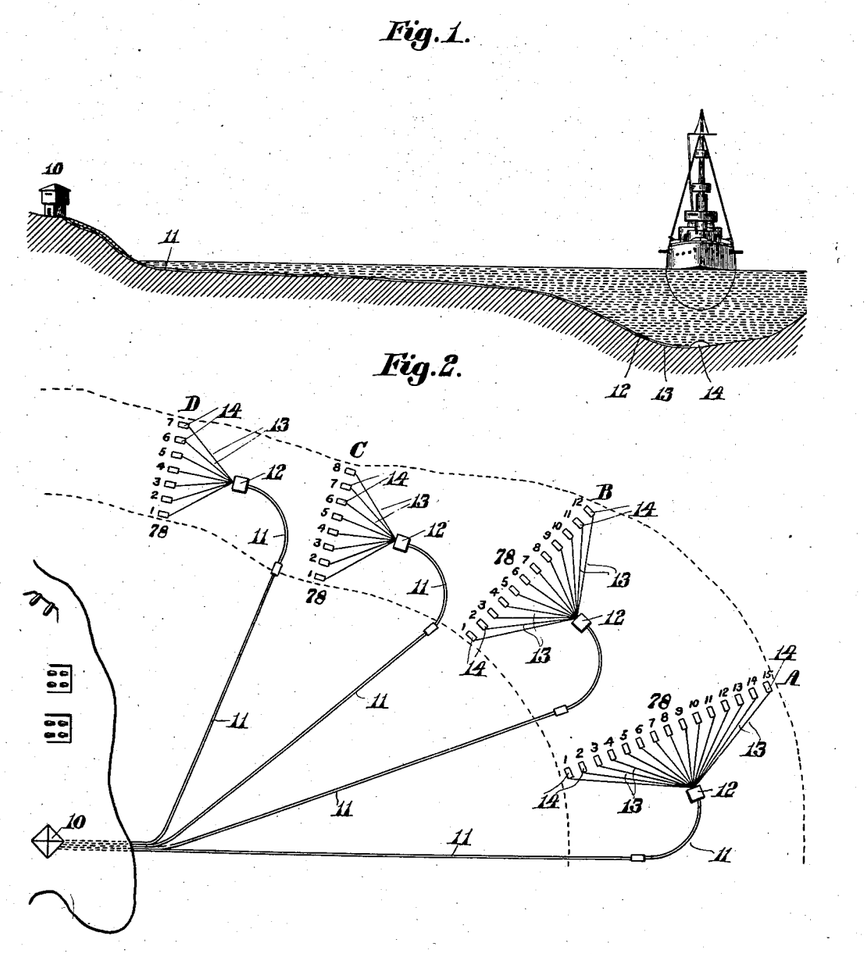
Figure 1 represents a vertical section through a part of a coast fortified for defense from the vessels of an enemy, showing the present invention applied thereto.
Fig. 2 represents a plan of a chart indicating the positions of the fire commander's station, the shore batteries and the various detectors in the channel adjacent to said batteries.

In the drawings, 10 represents the usual fire commander's station forming a part of a system for the defense of a coast. This station 10 is connected by means of a plurality of cables 11 with junction boxes 12 lying upon the bottom of a ship channel which it is desired to defend. From each of the junction boxes 12 radiate a plurality of double core cables 13 at the end of each of which is located a receptacle 14 which is provided with a suitable weight 15 which retains the receptacle at the bottom of the channel and prevents its displacement when once located. The top of the receptacle 14 is closed by means of a suitable cover 16 which hermetically seals the receptacle. Within the interior of the receptacle 14 is a suitable frame 17 having bearings 18 in which is mounted a revoluble shaft 19 to which is secured a cam member 20.

Figures 3, 4, 5:
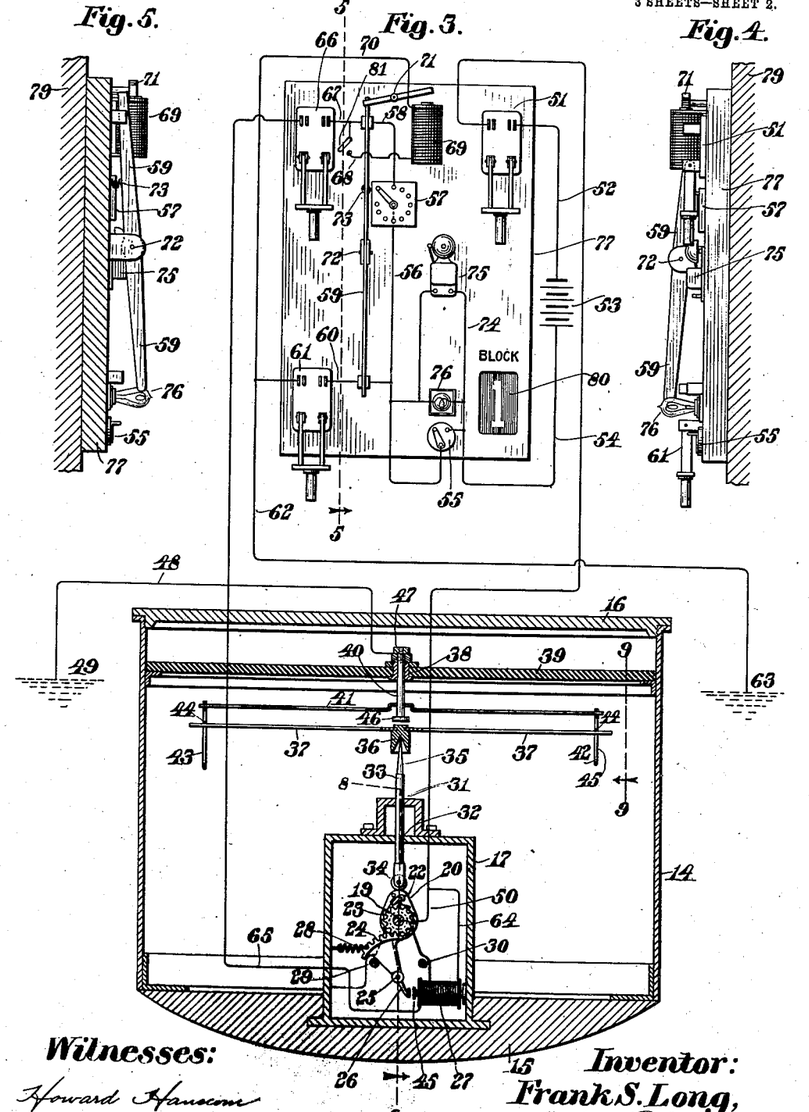
Fig. 3 represents a diagrammatic view showing a detector in vertical section, its indicator device in elevation, and the electric connections between the two.
Fig. 4 represents a side elevation of said indicator.
Fig. 5 represents a vertical section of the same, the cutting plane being on line 5—5 on Fig. 3.

Freely revoluble upon said shaft 19 is a ratchet wheel 21 which when used in one direction is adapted to engage a spring-operated pawl 22 pivoted to the cam 20 to move said cam 20 and shaft 19 about the axis of said shaft while at the same time said ratchet wheel is free to be moved in the opposite direction without affecting the rotation of said shaft 19. To the ratchet wheel 21 is secured a pinion 23 the teeth of which engage with a segment of a gear 24, pivoted at 25 and provided with an arm 26, which segment 24 is adapted to be moved about its pivot 25 by means of the solenoid 27 acting upon the arm 26 thus actuating the pinion 23 to cause said ratchet wheel 21 to be moved about the axis of the shaft 19 without affecting the operation of the pawl 22.

Interposed between the segment 24 and the frame 17 is a spring 28 which causes the segment 24 to be moved in the opposite direction when the solenoid 27 becomes demagnetized, this movement caused by the retraction of the spring 28 causing the ratchet wheel 21 to contact with the pawl 22 and move the cam 20 through an arc of 180°. The movement of the segment 24 is limited in either direction by means of the stops 29 and 30 on either side thereof. Immediately above the shaft 19 in bearings 31—32 is mounted a reciprocating rod 33 the lower end of which is provided with a revoluble truck 34 adapted to engage with and be actuated by the cam 20, the weight of said reciprocating rod being sufficient to maintain an engagement between the truck 34 and the cam 20 at all times. The upper end of the reciprocating rod 33 is tapered as indicated at 35 and extends into a conical socket 36 to which is secured a magnetic needle 37, said needle being free to move in azimuth about the pointed end 35 of said reciprocating rod while at the same time it may dip or tilt freely on said pointed end.

Figure 9:
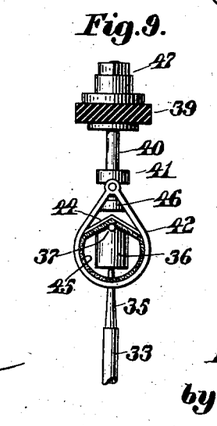
Fig. 9 represents a section through the support for needle centering device, showing an end view of this device and the magnetic needle.

In a bearing 38 forming a part of an insulating member 39 within said receptacle 14 is a depending rod 40 in axial line with the reciprocating rod 33 and mounted upon this rod 40 so as to be free to move horizontally about the axis thereof is a member 41 extending in opposite directions from the axis of said rod 40. To the end of each arm of said member 41 depends a loop 42—43 through which the ends of the needle 37 extend. The interior dimensions of the loop 42 is less than that of the loop 43 so that the needle 37 in moving about upon its support 35 is unable to contact with the surface of the loop 43. At the same time the loops 42—43 are so constructed that they are of equal weight so that the member 41 is perfectly balanced. The upper ends of the loops 42—43 are each provided with a V-shaped centering member 44 which is adapted to accurately center the needle 37 when the needle is lifted by means of the cam 20 and brought into contact with the V-shaped member 44, thus bringing the needle 37 and member 41 into the same plane. The inner face of the loop 42 is provided with a lining of carbon which prevents injury to the metal loop when contact is made between the same and the needle 37.

It is obvious from the foregoing description that when a current of electricity passes through the solenoid 27 the core 45 thereof will be moved outwardly into contact with the arm 26 of the segment 24 and cause said segment to be moved to the right of Fig. 3 without affecting the position of the cam 20. When said segment has reached the extreme of its movement in that direction and comes into contact with the stop 30 and the solenoid 27 has become demagnetized the spring 28 will act upon said segment to return it to its normal position, thus effecting a movement of the cam 20 about the axis of the shaft 19 through an arc of 180°, thus lifting the reciprocating rod 33 and causing the needle 37 to come into contact with and become centered by the V-shaped member 44, thus lifting the member 41 slightly above the head 46 of said depending rod 40. This lifting of the member 41 away from the head 46 reduces the friction between these two members so that the needle 37 with its centering member 41 is more freely moved about the axis of said reciprocating rod 33 permitting it to find its true magnetic north. As soon as this position has been fully determined and the needle comes to a rest, another current of electricity is passed through the solenoid 27 and the operation of the segment 24 is repeated, causing the cam 20 to again be moved through an arc of 180° to its original position, thereby permitting the reciprocating member 33 with its needle 37 to fall by its own weight, the member 41 also falling at the same time until it comes into contact with the head 46 which limits its movement, while the needle continues to drop until it has reached a position substantially central in the loops 42—43. When in this position it is obvious that whenever any mass of metal such as a warship enters the sphere of magnetic influence, the needle will be affected so as to either move in azimuth in one direction or the other or be tilted about the pointed end 35, this movement of the needle causing a contact to be made between the north pole of the needle and the interior face of the loop 42, thus making a complete electric circuit.

The upper end of the depending rod 40 is provided with a suitable binding post 47 from which extends a wire 48 to the ground 49. The shaft 19 is connected in circuit by a wire 50 to a switch 51 located at some distant point, as, for instance, in the fire commander's station 10 on the shore of the coast which it is desired to defend.

From the switch 51 extends a wire 52 connecting said switch with a suitable battery 53 said battery being also connected by means of a conductor 54 to a suitable switch 55 which in turn is connected by means of a conductor 56 to a suitable rheostat 57 adapted to regulate the amount of current passing through said conductor. This rheostat 57 is connected by means of the conductor 58 to a tripper switch 59 connected by means of a conductor 60 to a switch 61 from which a conductor 62 extends to a ground 63. From the wire 50 branches a wire 64 extending to the solenoid 27, the opposite end of the coil of which is connected by means of a wire conductor 65 to the switch 66, this switch being connected by means of the conductor 67 and branch conductor 68, to the tripper switch 59 and the armature magnet 69, the opposite end of the coil of which is connected by means of the conductor 70 to the switch 61 or through the conductor 62 to the ground 63.

A current of electricity passing through the magnet 69 is adapted to operate a pivoted armature 71, the opposite end of which extends over the tripper switch 59 which is pivoted at 72 and is moved about said pivot by means of a spring 73 when the pivoted armature 71 releases the same. This movement of the tripper switch 59 will break the circuit between the switch 66 and the rheostat 57 and at the same time cause a circuit to be made between the conductor 60 and the conductor 56.

Connected with the conductor 54 is a conductor 74 which connects with the conductor 56 and contains within the circuit an audible signal 75 such as a bell, and a visual signal, such as an electric light or lamp 76. The conductors 50 and 65 indicated in Fig. 3 form the double core cables 13 interposed between the receptacles 14 and the junction box 12 and extend from the junction box 12 to the fire commander's station 10 in the form of a multiple cable 11, which contains all the double core cables from a single group.

Figure 6:
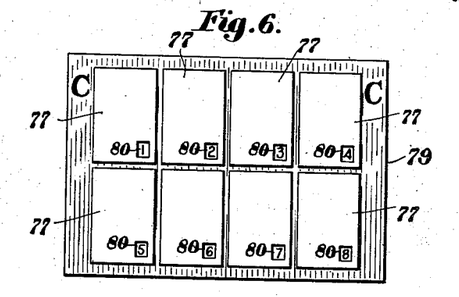
Fig. 6 represents an elevation of an indicator panel containing the indicators for an entire group of detectors.
Figure 7:
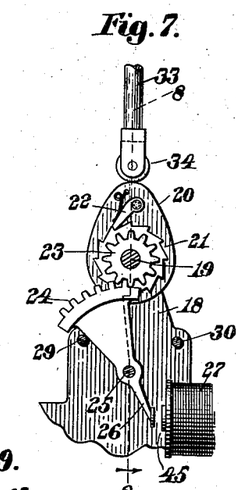
Fig. 7 represents an enlarged view of the cam-operating mechanism.
Figure 8:
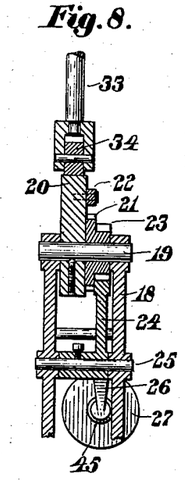
Fig. 8 represents a section of the same, the cutting plane being on line 8—8 on Fig. 7.

The various switches shown in Fig. 3 are all mounted upon a block 77 one of which is provided for each receptacle 14 in use. The blocks for every group 78 of detectors 14 are mounted together upon a suitable panel 79 and each of the blocks are provided with a number or other designating character 80 to indicate the particular receptacle with which it is connected. In like manner the panels containing the various blocks 77 are provided with suitable designating characters such as A, B, C, D, etc.

In the operation of the invention the normal position of the cam 20 has its longest axis downward with the reciprocating member 33 in its lowest position, the needle 37 also being in its lowest position while the member 41 rests upon the flanged head 46 with the ends of the needle 37 in the center of the loops 42—43. This is the normal position of the various parts contained within the receptacle 14 at all times until the approach of an enemy. When it has been discovered that an enemy is in the vicinity of the coast which is to be defended the operator within the fire commander's station 10 first closes the switches 51 and 55 leaving the switches 61, 66, and 81 open, and the tripping switch 59 locked by means of the armature lever 71. When the switches 51—55 are in this position the adjusting circuit may be made by means of the switch 66 which is normally open but when it is desired to adjust the needle 37 and the centering member 41 the switch 66 will be closed and a current will thereby be allowed to flow from the battery 53 through the conductor 65 to the solenoid 27, thus effecting a movement of the segment 24 and causing the cam 20 to be moved into the position shown in Fig. 3, as has been hereinbefore described. As soon as the switch 66 has been closed sufficiently long to permit the current to energize the solenoid 27 it is immediately opened and as soon as sufficient time has elapsed to permit the needle 37 and member 41 to come to rest at the true magnetic north the switch is again closed for a sufficient length of time to again energize the solenoid 27 and cause the cam 20 to be returned to its normal position as heretofore described. The apparatus is then in condition to serve as a detector upon the near approach of any warship or any other object capable of effecting a movement of the needle 37. In order to indicate the approach of such an object within the sphere of influence of said magnetic needle, it is desirable that at some distant point such as the fire commander's station, some visual and audible signal should be given to indicate the position of such an object and in order to do this it is necessary to open the switch 55 to allow the current passing from the battery 53 to pass through the bell or other audible signal 75 and the electric lamp or other visual signal 76, the switches 51—61 being closed under these conditions, while the switch 66 remains open, the switch 81 closed and the tripping switch 59 remains locked by means of the pivoted armature 71. When the switches are in this condition the whole apparatus is ready to operate so that as soon as a vessel or other object capable of effecting a movement of the needle 37 approaches within the sphere of magnetic influence the needle will be affected thereby to cause its movement about its support 35 so that the north pole thereof will either be tilted vertically or moved horizontally until it comes into contact with the carbon face of the loop 42 to complete the circuit and as soon as this circuit is thus completed a current of electricity passes through the magnet 69 and energizes this so that the pivoted armature 71 is operated upon to release the tripping switch 59 which when thus released is operated upon by the spring 73 to break the circuit between the rheostat 57 and the conductor 67 and makes a connection between the conductor 60 and the conductor 56. When this connection has been made the magnet 69 and rheostat 57 is cut out and the current passes directly from the switch 61 through the circuits containing the audible signal 75 and the visual signal 76 and causes both to operate. Both of these signals remain in operation until the operator comes to the panel and determines what block and what group is in operation. When he has determined what particular detector has been operated by means of the designating characters on the panel and the block on said panel he then opens the switch 51 which cuts out the apparatus and causes a cessation of the two signals. The operator then waits until the disturbing influence has moved away from the detector which is determined by suitable tests of the apparatus and as soon as he discovers that this is the fact he again opens the switch 61, locks the tripping switch 59 by means of the armature 71, and then closes the switch 51. When this has been accomplished the indicator is again in condition to repeat the operation as has been heretofore described. As soon as the operator hears the signal and by means of the visual signal determines which detector has operated, he determines the group designated and the block designated and sends this data to the plotting room where it is plotted upon the usual plotting board.

The accurate location of each of the detectors properly designated by numbers or other characters and the exact location of each of the groups are plotted upon the ordinary plotting board so that when any one of the detectors is operated and the information is sent to the plotting room that a designated detector of a designated group has been operated, the plotting room detail can accurately locate the position of the disturbing element and secure the exact range and azimuth from the gun by the usual methods to be sent to the gun commander in order that he may direct his fire at the particular locality in which the disturbing element may be at that time located.

Owing to the arrangement of the various detectors of groups at a designated distance from each other lengthwise of the channel, which distance is accurately known in the plotting room the exact speed of a vessel passing through the channel may be readily determined by noting the exact time that a detector is operated by such a vessel in the first group and then denoting the exact time that the same vessel operates a detector in the second group and making the necessary calculations therefor. It is obvious also that by accurately determining which detector of each group is operated in this manner by a passing vessel and drawing a line on the plotting board connecting the detectors thus operated that the exact direction of the vessel in the channel may be accurately determined as well as its speed.

It is obvious that in locating the various signals it is necessary that the weight 15 should be sufficient to always maintain the operating parts in a perfectly horizontal position and prevent the receptacle and the parts contained therein from being displaced in any manner regardless of the condition of the bottom of the channel. In practice it is intended that the receptacles should be suitably anchored in a bed of concrete which would prevent the receptacles from being disturbed under any ordinary conditions. Should, however, the enemy attempt to drag the channel and the dragging devices come into contact either with the receptacles or the cables connected therewith the receptacles would be bodily moved and the physical disturbance thereof which ensues would cause a movement of the needle 37 and an electric contact to be made which would indicate the presence of some disturbing influence at that particular point indicated on the block and panel. It is also obvious that the apparatus herein described is particularly adapted for use to disclose the presence of submarine vessels of an enemy, the presence of which could not be readily determined from the shore fortifications and if groups of these characters were placed in advance of the outer mine field the approach of the submarine vessels for the purpose of exploding the mines or cutting them loose would be discovered before they had reached the mine field and were able to do any damage. When these outer detectors are disturbed by the presence of submarines or other boats attempting to destroy the mine field and their location is accurately designated to the shore fortifications, fire can be opened on them by mortars or other high angle fire which would be liable to put them out of commission or make their position untenable.

Not only may the vessels of an enemy be located by this apparatus when in the water area adjacent to a fortification, which under normal conditions would be in view of the observers of the defense, but these vessels could also be located when in waters or anchorages concealed from these observers. It is obvious that when these vessels are thus located by this apparatus their position would soon be made untenable by mortars and other high angle ordnance, the range and azimuth being furnished the gun commander from the fire commander's station where the indicators connected with the detectors are located.

Another great advantage of the apparatus is that at night the location of an enemy may be accurately determined without the use of the shore illuminating and searchlights which betray to the enemy the position of the defense. It is quite obvious that the same devices may be utilized on land with the detectors buried at certain points in advance of a fortification to indicate the presence of artillery.

Another purpose for which the device could be utilized is to designate dangerous shoals or submerged reefs by having detectors placed in advance of such dangerous places and connected to audible or visual signals or both, located upon such dangerous places or adjacent thereto, which would be operated by the near approach of a vessel and thus warn the shipmaster of approaching danger.

Having thus described my invention, I claim:

1. The combination of a device including a magnetically operated circuit closer normally open adapted to be operated to close said circuit without betraying its location by the presence in its immediate vicinity of a mass of metal; an apparatus at a distant point therefrom adapted to indicate such presence in the vicinity of said device; and means interposed between said device and apparatus whereby the latter will be actuated by the operation of the former.

2. The combination of a device including a magnetically operated circuit closer normally open adapted to be operated to close said circuit without betraying its location by the presence in its immediate vicinity of a mass of metal; an apparatus at a distant point therefrom adapted to indicate such presence in the vicinity of said device; and an electric circuit interposed between said device and apparatus whereby the latter will be actuated by the operation of the former.

3. The combination of a device adapted to be operated by the presence in its immediate vicinity of a mass of metal; an apparatus at a distant point therefrom adapted to indicate such presence in the vicinity of said device; means interposed between said device and apparatus whereby the latter will be actuated by the operation of the former; and means for retaining said device in inoperative position until released.

4. The combination of a device including a movable member adapted to be operated by the presence in its immediate vicinity of a mass of metal; an electric lamp at a distant point therefrom; mechanism for centering said movable member; means located at a distant point for operating said centering mechanism; and means including a contact member interposed between said device and electric lamp whereby the latter will be lighted by the engagement of said movable member and said contact member.

5. The combination of a device including a movable member adapted to be operated by the presence in its immediate vicinity of a mas of metal; an electric lamp and a bell at a distant point therefrom; mechanism for centering said movable member; means located at a distant point for operating said centering mechanism; and means including a contact member interposed between said device and electric lamp and bell whereby the lamp will be lighted and the bell rung by the engagement of said movable member and said contact member.

6. The combination of a device including a magnetically operated circuit closer normally open adapted to be operated to close said circuit by the presence in its immediate vicinity of a mass of metal without betraying the location of said device; an indicator at a distant point therefrom; means interposed between said device and indicator whereby the latter will be actuated by the operation of the former; and a switch adjacent to said indicator adapted to put said device in and out of commission.

7. The combination of a submerged device including a movable member adapted to be operated by the presence of a vessel in its immediate vicinity; an indicator at a distant point therefrom; a contact member co-acting with said movable member; means at a distant point for positioning said contact member; and a connection between said indicator and submerged device whereby any operation of said submerged device that causes an engagement between said contact member and said movable member will effect an operation of said indicator and cause a fact to be indicated thereby.

8. The combination of a submerged device including a movable member adapted to be operated by the presence of a vessel in its immediate vicinity; an electric lamp at a distant point therefrom; a contact member co-acting with said movable member; means at a distant point for positioning said contact member; and a connection between said electric lamp and submerged device whereby any operation of said submerged device that causes an engagement between said contact member and movable member will effect an operation of said indicator and cause a fact to be indicated thereby.

9. The combination of a submerged device including a movable member adapted to be operated by the presence of a vessel in its immediate vicinity; a visual signal at a distant point therefrom; a contact member co-acting with said movable member; means at a distant point for positioning said contact member; and a connection between said visual signal and submerged device whereby any operation of said submerged device that causes an engagement between said contact member and movable member will effect an operation of said indicator and cause a fact to be indicated thereby.

10. The combination of a submerged receptacle; a magnetic needle therein; an indicator removed from said receptacle; a contact member on each side of said needle; means at a distant point for positioning said contact members; an electric circuit between said indicator and receptacle; and mechanism actuated by said needle when in engagement with either contact member adapted to energize said indicator.

11. The combination of a submerged receptacle; a magnetic needle therein; an indicator including both a visual and an audible signal removed from said receptacle; a contact member on each side of said needle; means at a distant point for positioning said contact members; and mechanism actuated by said needle when in engagement with either of said contact members adapted to energize said indicator.

12. The combination of a submerged receptacle; a magnetic needle therein; an indicator including both a visual and an audible signal removed from said receptacle; a contact member on each side of said needle; means at a distant point for positioning said contact members; an electric circuit between said indicator and receptacle; mechanism actuated by said needle when in engagement with either of said contact members to energize said indicator; and means in said electric circuit for cutting out said needle until its operation is desired.

13. The combination of a plurality of submerged devices each containing a magnetically operated circuit closer normally open adapted to be operated to close said circuit by the presence of a vessel in its immediate vicinity without betraying its location; an indicator at a distant point provided with a separate signal for each device; and an electric circuit normally open interposed between said devices and said indicator adapted to operate a different signal for each device whenever such device is set in operation.

14. The combination of a plurality of submerged devices each containing a magnetically operated circuit closer normally open adapted to be operated to close said circuit by the presence of a vessel in its immediate vicinity without betraying its location; an indicator at a distant point provided with a separate signal for each device; an electric circuit interposed between said devices and said indicator adapted to operate a different signal for each device whenever such device is set in operation; and means for cutting out said devices until their operation is required.

15. The combination with a submerged receptacle of a magnetic needle contained therein; an indicator; an electric circuit between said indicator and needle; a contact member in the path of said needle on each side thereof; and means for normally locating said contacts in positions equidistant from said needle when at rest so that the electric circuit will be closed by any movement of said needle due to the action thereon of a mass of metal within its sphere of magnetic influence.

16. The combination of a magnetic needle; contact members therefor; a device for normally centering said needle between said contact members; means located at a distant point for controlling said device; an indicator; an electric circuit between said indicator and needle normally open; and means for closing said circuit by the movement of said needle due to the action thereon of a mass of metal within its sphere of magnetic influence.

17. The combination of a magnetic needle; a member adapted to temporarily rest on said needle; means for separating said member and needle; an indicator; an electric circuit between said indicator and needle normally open; and means for closing said circuit by the movement of said needle due to the action thereon of a mass of metal within its sphere of magnetic influence.

18. The combination of a magnetic needle; a member adapted to temporarily rest on said needle; a revoluble cam for separating said member therefrom; an indicator; an electric circuit between said indicator and needle normally open; and means for closing said circuit by the movement of said needle due to the action thereon of a mass of metal within its sphere of magnetic influence.

19. The combination with a submerged receptacle of a magnetic needle contained therein; a vertical support therefor; a revoluble cam beneath said support; means for actuating said cam to alternately raise and lower said support; an indicator; an electric circuit between said needle and indicator normally open; and means for closing said circuit by the movement of said needle due to the action thereon of a mass of metal within its sphere of magnetic influence.

20. The combination of a magnetic needle; a vertical support therefor; a revoluble cam; a solenoid for actuating said cam to alternately raise and lower said support; an indicator; an electric circuit between said needle and indicator normally open; and means for closing said circuit by the movement of said needle due to the action thereon of a mass of metal within its sphere of magnetic influence.

21. The combination of a magnetic needle; a vertical support therefor; a revoluble cam; a solenoid for actuating said cam to alternately raise and lower said support; means located at a distant point adapted to energize said solenoid; an indicator; an electric circuit between said needle and indicator normally open; and means for closing said circuit by the movement of said needle due to the action thereon of a mass of metal within its sphere of magnetic influence.

22. The combination of a magnetic needle; a vertical support therefor; a member freely revoluble above said needle; a revoluble cam; means for actuating said cam to alternately raise and lower the needle and said member; means for limiting the downward movement of said member; an indicator; an electric circuit between said needle and indicator normally open; and means for closing said circuit by the movement of said needle due to the action thereon of a mass of metal in its sphere of magnetic influence.

23. The combination of a magnetic needle; a vertical support therefor; a member freely revoluble above said needle; a loop depending from either end of said member and surrounding said needle; a revoluble cam; means for actuating said cam to alternately raise and lower said support; an indicator; an electric circuit between said needle and indicator normally open; and means for closing said circuit by the movement of said needle due to the action thereon of a mass of metal in its sphere of magnetic influence.

24. The combination of a magnetic needle; a vertical support therefor; a member freely revoluble above said needle; a loop depending from either end of said member and surrounding said needle, the loop at the north pole of said needle being smaller than the other; a revoluble cam; means for actuating said cam to alternately raise and lower said support; an indicator; an electric circuit between said needle and indicator normally open; and means for closing said circuit by the movement of said needle due to the action thereon of a mass of metal in its sphere of magnetic influence.

25. The combination of a magnetic needle; a vertical support therefor; a member freely revoluble above said needle; a loop depending from either end of said member and surrounding said needle, the loop at the north pole of said needle being smaller than the other; a carbon lining to the smaller loop; a revoluble cam; means for actuating said cam to alternately raise and lower said support; an indicator; an electric circuit between said needle and indicator normally open; and means for closing said circuit by the movement of said needle due to the action thereon of a mass of metal in its sphere of magnetic influence.

26. The combination of a magnetic needle; a vertical support therefor; a member freely revoluble above said needle; a loop depending from either end of said member and surrounding said needle, the loop at the north pole of said needle being smaller than the other; a carbon lining to the smaller loop; an inverted V-shaped needle centering device in each loop; a revoluble cam; means for actuating said cam to alternately raise and lower said support; an indicator; an electric circuit between said needle and indicator normally open; and means for closing said circuit by the movement of said needle due to the action thereon of a mass of metal in its sphere of magnetic influence.

27. The combination of a magnetic needle; a vertical support therefor; a member freely revoluble above said needle; a loop depending from either end of said member and surrounding said needle, the loop at the north pole of said needle being smaller than the other; a carbon lining to the smaller loop; a needle centering device for each loop; a revoluble cam; means for actuating said cam to alternately raise and lower said support; an indicator; an electric circuit between said needle and indicator normally open; and means for closing said circuit by the movement of said needle due to the action thereon of a mass of metal in its sphere of magnetic influence.

28. The combination of a magnetic needle; a vertical support therefor; a headed support above and in axial line with said needle support; a member loosely mounted thereon above said needle; a loop depending from either end of said member and surrounding said needle, the loop at the north pole of said needle being smaller than the other; a carbon lining to the smaller loop; a revoluble cam; means for actuating said cam to alternately raise and lower said support; an indicator; an electric circuit between said needle and indicator normally open; and means for closing said circuit by the movement of said needle due to the action thereon of a mass of metal in its sphere of magnetic influence.

29. The combination of a magnetic needle; a vertical support therefor; a headed support above and in axial line with said needle support; a member loosely mounted thereon above said needle; a loop at each end of said member surrounding said needle; a revoluble cam; means for actuating said cam to alternately raise and lower said support; an indicator; an electric circuit between said needle and indicator normally open; and means for closing said circuit by the movement of said needle due to the action thereon of a mass of metal in its sphere of magnetic influence.

30. The combination of a magnetic needle; a vertical support therefor; a cam for alternately raising and lowering said support and needle; a member freely revoluble above said needle; means for bringing said member and needle into the same vertical plane; an indicator; an electric circuit between said needle and indicator normally open; and means for closing said circuit by the movement of said needle due to the action thereon of a mass of metal within its sphere of magnetic influence.

31. The combination of a magnetic needle; a vertical support therefor; a cam for alternately raising and lowering said support and needle; means for alternately rotating said cam through arcs of 180°; a member freely revoluble above said needle; means for bringing said member and needle into the same vertical plane; an indicator; an electric circuit between said needle and indicator normally open; and means for closing said circuit by the movement of said needle due to the action thereon of a mass of metal within its sphere of magnetic influence.

32. The combination of a magnetic needle; a vertical support therefor; a cam for alternately raising and lowering said support and needle; a spring-pressed pawl on said cam; a ratchet wheel with which said pawl is adapted to engage loosely mounted on the shaft of said cam; means for alternately moving said wheel in opposite directions; an indicator; an electric circuit between said needle and indicator normally open; and means for closing said circuit by the movement of said needle due to the action thereon of a mass of metal within its sphere of magnetic influence.

33. The combination of a magnetic needle; a vertical support therefor; a cam for alternately raising and lowering said support and needle; a spring-pressed pawl on said cam; a ratchet wheel with which said pawl is adapted to engage loosely mounted on the shaft of said cam; a gear secured to said ratchet wheel; a pivoted gear segment meshing therewith; means for moving said gear segment alternately in opposite directions; an indicator; an electric circuit between said needle and indicator normally open; and means for closing said circuit by the movement of said needle due to the action thereon of a mass of metal within its sphere of magnetic influence.

34. The combination of a magnetic needle; a vertical support therefor; a cam for alternately raising and lowering said support and needle; a spring-pressed pawl on said cam; a ratchet wheel with which said pawl is adapted to engage loosely mounted on the shaft of said cam; a gear secured to said ratchet wheel; a pivoted gear segment meshing therewith; a solenoid adapted to move said segment in one direction; a spring adapted to move said segment in the opposite direction; an indicator; an electric circuit between said needle and indicator normally open; and means for closing said circuit by the movement of said needle due to the action thereon of a mass of metal within its sphere of magnetic influence.

35. The combination of a magnetic needle; a vertical support therefor; a cam for alternately raising and lowering said support and needle; a spring-pressed pawl on said cam; a ratchet wheel with which said pawl is adapted to engage loosely mounted on the shaft of said cam; a gear secured to said ratchet wheel; a pivoted gear segment meshing therewith; a solenoid adapted to move said segment in one direction; a spring adapted to move said segment in the opposite direction; stops to limit the movement of said segment in each direction; an indicator; an electric circuit between said needle and indicator normally open; and means for closing said circuit by the movement of said needle due to the action thereon of a mass of metal within its sphere of magnetic influence.

36. The combination with a detector consisting of a submerged hermetically sealed receptacle containing a normally open circuit closer including a magnetic needle adapted to close said circuit when affected by the presence of a mass of metal within its sphere of magnetic influence without betraying the location of said detector; of an indicator in said circuit provided with a visual and audible signal adapted to be operated by the closing of said circuit.

37. The combination with a detector provided with a magnetic needle adapted to close an electric circuit when affected by the presence of a mass of metal within its sphere of magnetic influence; of a tripper switch; means for normally locking said switch; a signal device connected with said switch; and means operable by the closure of said circuit to release said tripper switch and permit it to close the circuit to said signal device and effect its operation.

38. The combination with a detector provided with a magnetic needle adapted to close an electric circuit when affected by the presence of a mass of metal within its sphere of magnetic influence; of a tripper switch; a pivoted lever for locking said tripper switch; a signal device, and an electro-magnet adapted to operate said lever to release said switch and permit it to close the circuit to said signal device and effect its operation.

39. The combination of a submerged device including a magnetically operated circuit closer normally open adapted to be operated to close said circuit by the presence of a vessel in its immediate vicinity without betraying the location of said device; means located at a distant point and connected thereto for placing said device in and out of commission; and mechanism also at a distant point adapted to indicate when said device is operated.

Signed by me at #7 Water st., Boston, Mass., this 15th day of February, 1908.

FRANK S. LONG.

Witnesses:
EDNA C. CLEVELAND,
WALTER E. LOMBARD.